United States Patent
Liu et al.

(10) Patent No.: US 10,410,112 B2
(45) Date of Patent: Sep. 10, 2019

(54) APPARATUS AND METHOD FOR PERFORMING A FORWARD OPERATION OF ARTIFICIL NEURAL NETWORKS

(71) Applicant: CAMBRICON TECHNOLOGIES CORPORATION LIMITED, Beijing (CN)

(72) Inventors: Shaoli Liu, Beijing (CN); Qi Guo, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/039,567

(22) Filed: Jul. 19, 2018

(65) Prior Publication Data

US 2018/0322381 A1    Nov. 8, 2018

Related U.S. Application Data

(63) Continuation-in-part of application No. PCT/CN2016/078281, filed on Apr. 1, 2016.

(30) Foreign Application Priority Data

Jan. 20, 2016 (CN) .......................... 2016 1 0037645

(51) Int. Cl.
*G06N 3/02* (2006.01)
*G06N 3/04* (2006.01)
*G06F 9/38* (2018.01)

(52) U.S. Cl.
CPC ............. *G06N 3/04* (2013.01); *G06F 9/3885* (2013.01); *G06N 3/02* (2013.01)

(58) Field of Classification Search
CPC ...... G06F 9/30145; G06F 9/3885; G06F 9/22; G06F 9/3877; G06N 3/02; G06N 3/04; G06N 3/084
See application file for complete search history.

(56) References Cited

U.S. PATENT DOCUMENTS 9,607,355 B2 * 3/2017 Zou ........................... G06T 1/20

OTHER PUBLICATIONS

Gu et al., "A Parallel Computing Platform for Training Large Scale Neural Networks", IEEE, 2013. (Year: 2013).*
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
(Continued)

*Primary Examiner* — Benjamin P Geib
(74) *Attorney, Agent, or Firm* — Getech Law LLC; Jun Ye

(57) ABSTRACT

Aspects for executing forward propagation of artificial neural network are described here. As an example, the aspects may include a plurality of computation modules connected via an interconnection unit; and a controller unit configured to decode an instruction into one or more groups of microinstructions, wherein the plurality of computation modules are configured to perform respective groups of the microinstructions.

18 Claims, 7 Drawing Sheets

(56) References Cited

OTHER PUBLICATIONS

S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

\* cited by examiner

APPARATUS AND METHOD FOR PERFORMING A FORWARD OPERATION OF ARTIFICIL NEURAL NETWORKS

TECHNICAL FIELD

The present disclosure generally relates to the technical field of artificial neural network, and specifically, relates to an apparatus and method for executing the forward propagation of the artificial neural network.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities.

A known method to support the forward propagation of a multilayer artificial neural network is to use a general-purpose processor. Such a method uses a general-purpose register file and a general-purpose functional unit to execute general-purpose instructions to support the aforementioned algorithm. However, one of the defects of the method is low operational performance of a single general-purpose processor which cannot meet performance requirements for usual multilayer neural network operations. When multiple general-purpose processors execute concurrently, the intercommunication among them also becomes a performance bottleneck. In addition, a general-purpose processor needs to decode the reverse computation of a multilayer artificial neural network into a long queue of computations and access instruction sequences, and a front-end decoding on the processor brings about higher power consumption.

Another known method to support the forward propagation of the multilayer artificial neural network is to use a graphics processing unit (GPU). Such a method uses a general-purpose register file and a general-purpose stream processing unit to execute general purpose single-instruction-multiple-data (SIMD) instructions to support the aforementioned algorithm. Since GPU is an apparatus specially for executing graph and image operation as well as scientific computation and fails to specially support multilayer artificial neural network operations, the GPU remains in need of a great amount of front-end decoding to execute multilayer artificial neural network operations, thus producing plenty of additional overheads. Besides, since GPU only contains rather small on-chip caching, then model data (weight values) of a multilayer artificial neural network has to be repeatedly moved from the off-chip, and off-chip bandwidth becomes a main performance bottleneck, causing huge power consumption.

SUMMARY

One aspect of the present disclosure provides an apparatus for performing forward propagation computation of artificial neural networks. The apparatus comprises an instruction caching unit, a controller unit, a direct memory access unit, an interconnection unit, multiple computation modules that further include at least one master computation module and multiple slave computation modules. The instruction caching unit may be configured to read instructions via the direct memory access unit and cache the read instruction. The controller unit may be configured to read instructions from the instruction caching unit and to decode the instructions into micro-instructions for controlling the operation of the interconnection unit, the master computation module and the slave computation modules. The direct memory access unit may be configured to write data into corresponding data caching units of the master computation module and each slave computation module from an external address space (e.g., an external storage device) or read data from the data cache units to the external address space. In the initial computing stage of the forward propagation process of neural networks in each layer, the master computation module may be configured to communicate an input vector of this layer to the slave computation modules via the interconnection module. After the slave computation modules complete the computation, the interconnection unit may be configured to combine the slave output values generated by the slave computation modules level-by-level into an intermediate result vector. The master computation module may be configured to generate an output vector based on the intermediate result vector.

Another aspect of the present disclosure provides a method for performing forward propagation computation of single-layer artificial neural network by using the above apparatus.

Still another aspect of the present disclosure provides a method for performing forward propagation computation of multilayer artificial neural networks by using the above apparatus.

BRIEF DESCRIPTION OF THE DRAWINGS

To perfectly understand the present disclosure and the advantages thereof, the present disclosure is described as below with reference to the drawings.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are a lot specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

The forward propagation computation of multilayer artificial neural networks according to embodiments of the present disclosure comprises operations in two or more layers. For each layer, a dot product operation may be performed to an input vector and a weight vector and from the result is obtained an output neuron through an activation function. The activation function may be sigmoid function, tan h function, relu function, softmax function, etc.

Figure 1A:
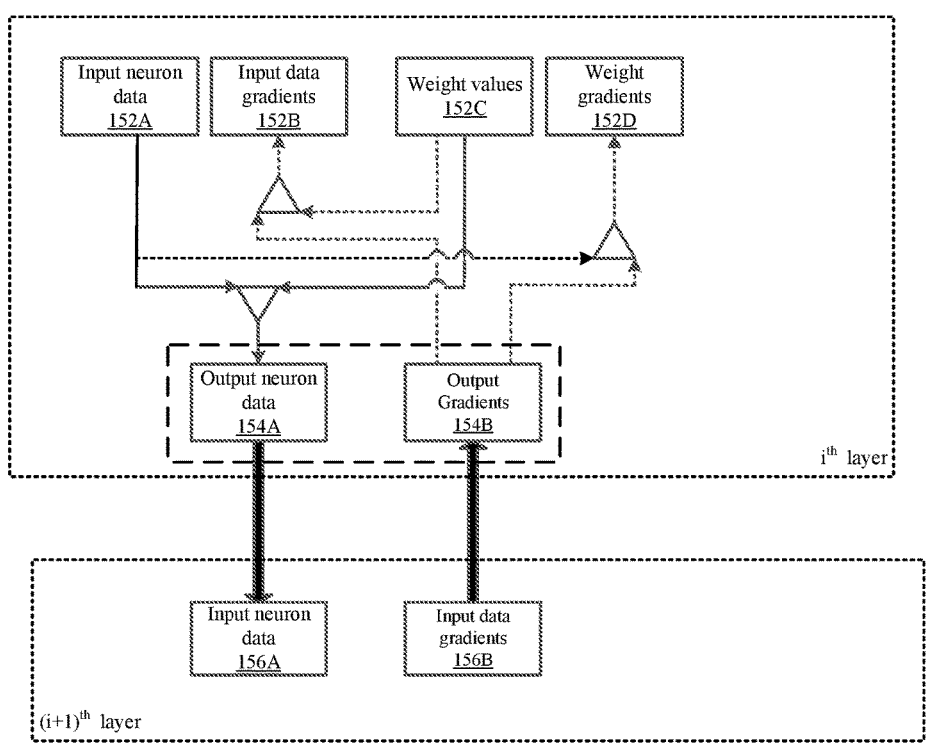
FIG. 1A is a block diagram illustrating an example computing process for MNNs.

FIG. 1A is a block diagram illustrating an example computing process 100 at an MNN acceleration processor for neural networks. The computing process 100 is a merely example showing neural network operations that involve input data and weight values and should not be limited to such operations. For example, other unshown neural network operations may include pooling operations, etc.

As depicted, the example computing process 100 may be performed from the nth layer to the $(n+1)^{th}$ layer. The term "layer" here may refer to a group of operations, rather than a logic or a physical layer. A triangular-shaped operator (A as shown in FIG. 1) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire process. Rather, the layers of operations may refer to any two consecutive layers in a neural network. As described below in greater detail, the computing process from the $n^{th}$ layer to the $(n+1)^{th}$ layer may be referred to as a forward propagation process; the computing process from $(n+1)^{th}$ layer to the nth layer may be referred to as a backward propagation (also may be interchangeably referred to as backpropagation) process.

The forward propagation process may start from input neuron data received at the $n^{th}$ layer (e.g., input neuron data 152A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 152A may be multiplied or convolved by one or more weight values 152C. The results of the multiplication or convolution may be transmitted as output neuron data 154A. The output neuron data 154A may be transmitted to the next layer (e.g., the $(n+1)^{th}$ layer) as input neuron data 156A. The forward propagation process may be shown as the solid lines in FIG. 1.

The backward propagation process may start from the last layer of the forward propagation process. For example, the backward propagation process may include the process from the $(n+1)^{th}$ layer to the $n^{th}$ layer. During the process, the input data gradients 156B may be transmitted to the $n^{th}$ layer as output gradients 154B. The output gradients 154B may then be multiplied or convolved by the input neuron data 152A to generate weight gradients 152D. Additionally, the output gradients 154B may be multiplied by the weight values 152C to generate input data gradients 152B. The backward propagation process may be shown as the dotted lines in FIG. 1.

Figure 1B:
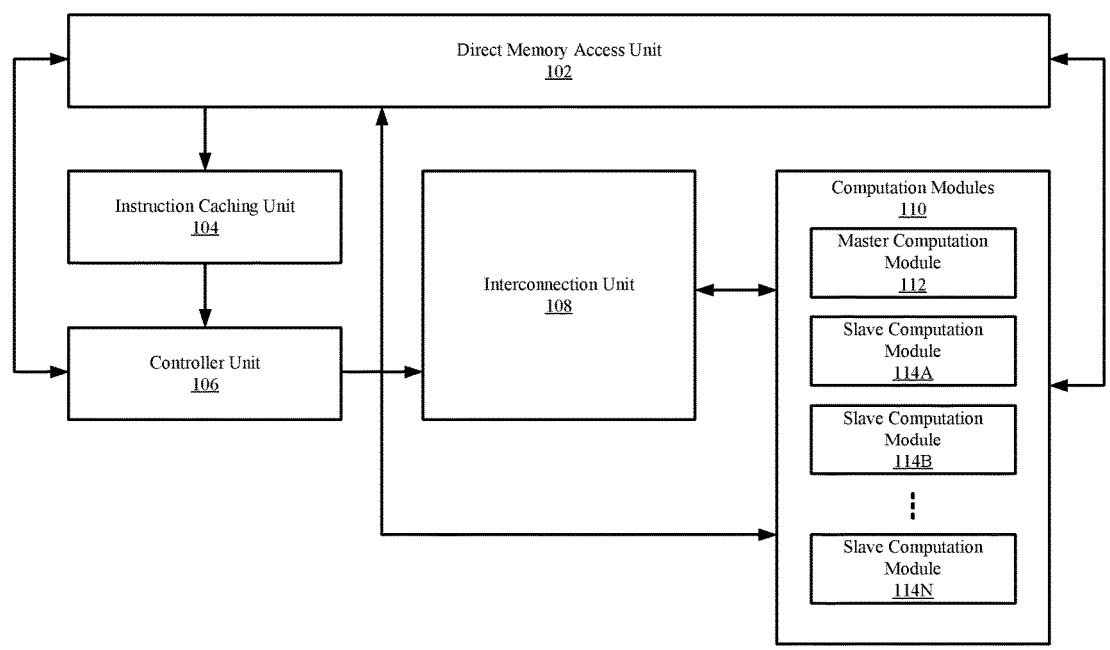
FIG. 1B illustrates a block diagram of the overall structure of the apparatus for performing a forward propagation operation of artificial neural networks according to embodiments of the present disclosure.

FIG. 1B illustrates a block diagram of the general structure of the apparatus for performing a forward propagation operation of artificial neural networks according to embodiments of the present disclosure. As shown in FIG. 1B, the apparatus comprises an instruction caching unit 104, a controller unit 106, a direct memory access unit 102, an interconnection unit 108, multiple computation module 110 including a master computation module 112 and multiple slave computation modules 114 (e.g., 114A-114N). The instruction caching unit 104, the controller unit 106, the direct memory access unit 102, the interconnection unit 108, the master computation module 112 and the slave computation modules 114 may be implemented in hardware circuits (for example, an application-specific integrated circuit (ASIC)).

In some examples, the instruction caching unit 104 may be configured to receive or read instructions from the direct memory access unit 102 and cache the received instructions. The controller unit 106 may be configured to read instructions from the instruction caching unit 104 and decode one of the instructions into micro-instructions for controlling operations of other modules including the direct memory access unit 102, the master computation module 112, the slave computation modules 114, etc. In other words, the modules including the direct memory access unit 102, the master computation module 112, and the slave computation modules 114 may be configured to respectively perform the micro-instructions.

The direct memory access unit 102 may be configured to access an external address range (e.g., in an external storage device) and directly read or write data into respective caching units in the multiple computation modules 110.

Figure 2:
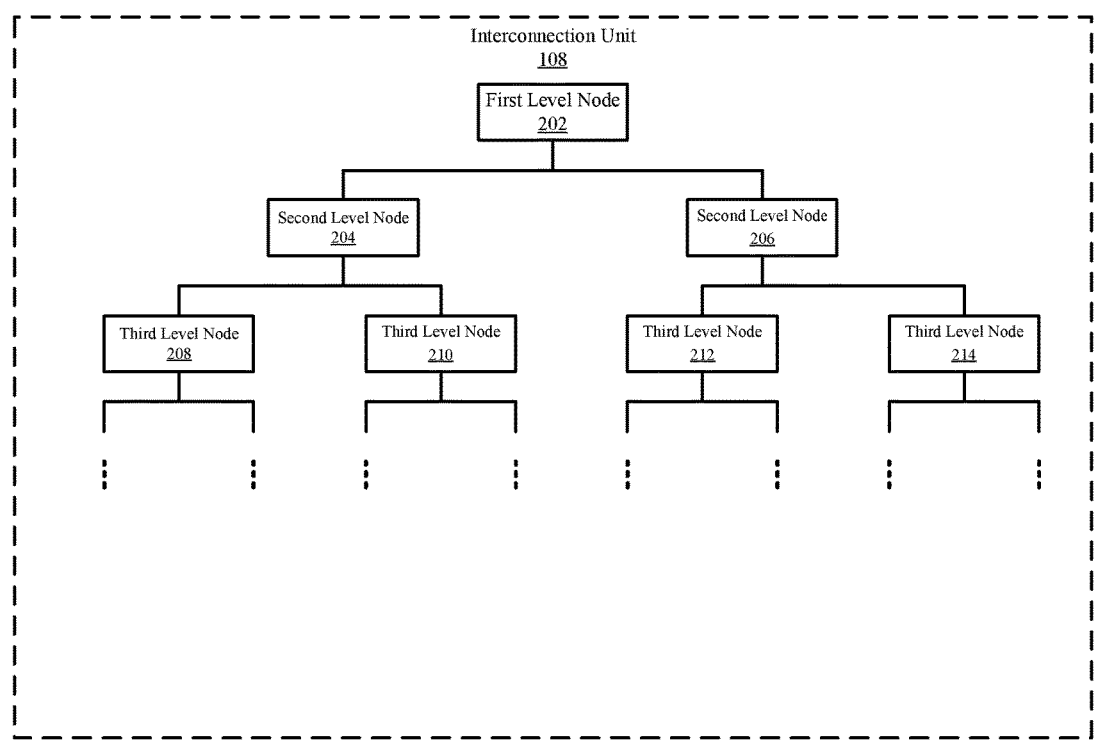
FIG. 2 illustrates the structure of the interconnection unit in the apparatus for performing a forward propagation operation of artificial neural networks according to embodiments of the present disclosure.

FIG. 2 illustrates the structure of the interconnection unit in the apparatus for performing a forward propagation operation of artificial neural networks according to embodiments of the present disclosure. As depicted, the interconnection module 108 may be structured as a binary tree that includes multiple levels (e.g., from the first level to lower levels). Each level may include one or more nodes. Each node may be configured to send data to two nodes at a lower level. Further, each node may combine data received from two nodes at a lower level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level (e.g., a and b) and the sum of the addition (e.g., a+b) may be sent to the node at the high level.

For example, in the initial computing stage of artificial neural networks in each layer, the input data (e.g., input neuron data 152A) may be transmitted to respective slave computation modules 114 by the master computation module 112 via the interconnection unit 108. In at least some examples, the input data may refer to an input vector or a segment of the input vector.

When the computation process of the slave computation modules 114 completes, the respective result of the computation process at each of slave computation modules 114 may be output as a slave output value. The slave output values may be transmitted to the interconnection unit 108 and combined by the interconnection unit 108 into an intermediate result vector.

Taking a full connection layer of the neural network as an example, with respect to an $i^{th}$ layer, the length of the input vector may be represented as $L_i$ and the length of the output vector may be represented as $L_{i+1}$. In the case where the number of the slave computation modules 114 may be represented as N, the length of the input vector may be shown as $L_i$=mN+n, in which m and n may refer to an integer equal to or greater than zero.

In the example where $L_i$ is greater than N, the slave computation modules 114 may be configured to sequentially process segments of the input vector at different time slots. Each segment of the input vector may include a number of elements, e.g., N elements. In the first time slot, the slave computation modules 114 may be configured to process the first segment of the input vector and to further process other segments later.

In at least some example, the master computation module 112 may be configured to supplement one or more zero values to the input vector such that the input vector may be divided into multiple segments and the length of each segment may be equal to the number of slave computation modules 114. For example, the master computation module 112 may supplement N-n zero values to the input value such that the modified length of input vector $L_i'$ may equal to (m+1)N.

With respect to a segment of the input vector at the $i^{th}$ layer, a slave computation module (e.g., 114J) may be configured to calculate the $j^{th}$ element in the segment and output the $j^{th}$ element as a slave output value.

The slave output values of this segment of the input vector may be combined into an intermediate result vector in the interconnection unit 108. Multiple intermediate result vectors generated based on the segments of the input vector may be further combined by the master computation module 112 to generate a merged intermediate vector. The merged intermediate vector may be further processed by the master computation module 112 to generate an output vector.

Figure 3:
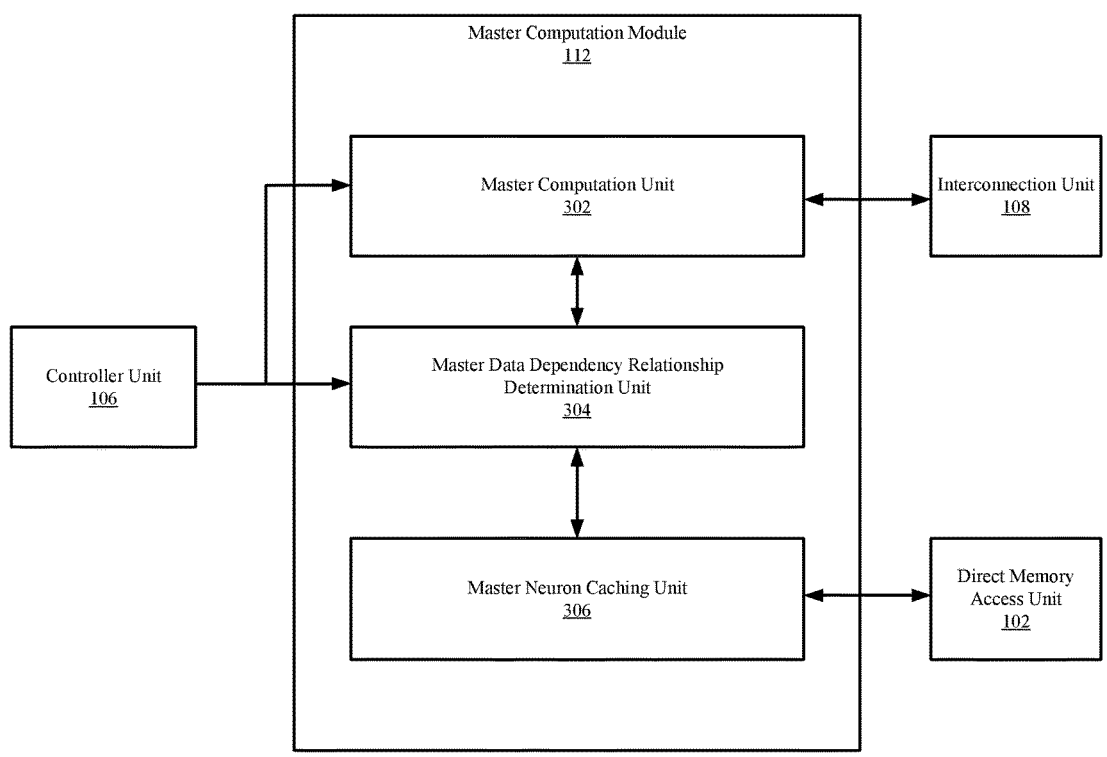
FIG. 3 illustrates a block diagram of the structure of the master computation module in the apparatus for performing a forward propagation computation of artificial neural networks according to embodiments of the present disclosure.

FIG. 3 illustrates a block diagram of the structure of the master computation module in the apparatus for performing a forward propagation computation of artificial neural networks according to embodiments of the present disclosure. As shown in FIG. 3, the master computation module 112 may include a master computation unit 302, a master data dependency relationship determination unit 304, and a master neuron caching unit 306.

The master neuron caching unit 306 is configured to cache the data input and output by the master computation module 112 in the process. The master data dependency relationship determination unit 304 may serve as an interface between the master computation unit 302 and the master neuron caching unit 306. In other words, the master computation unit 302 may be configured to read data from or write data to the master neuron cache unit 306 and to prevent read-write inconsistency of data in the master neuron caching unit 306. Further, the master data dependency relationship determination unit 304 may be configured to transmit the input vector or the segments of the input vector to the slave computation modules 114 via the master computation unit 302. Data output from the slave computation modules 114 may be received by the master computation unit 302 via the interconnection unit 108. Instructions may be transmitted by the controller unit 106 to the master computation unit 302 and the master data dependency relationship determination unit 304 to control their operations.

Figure 4:
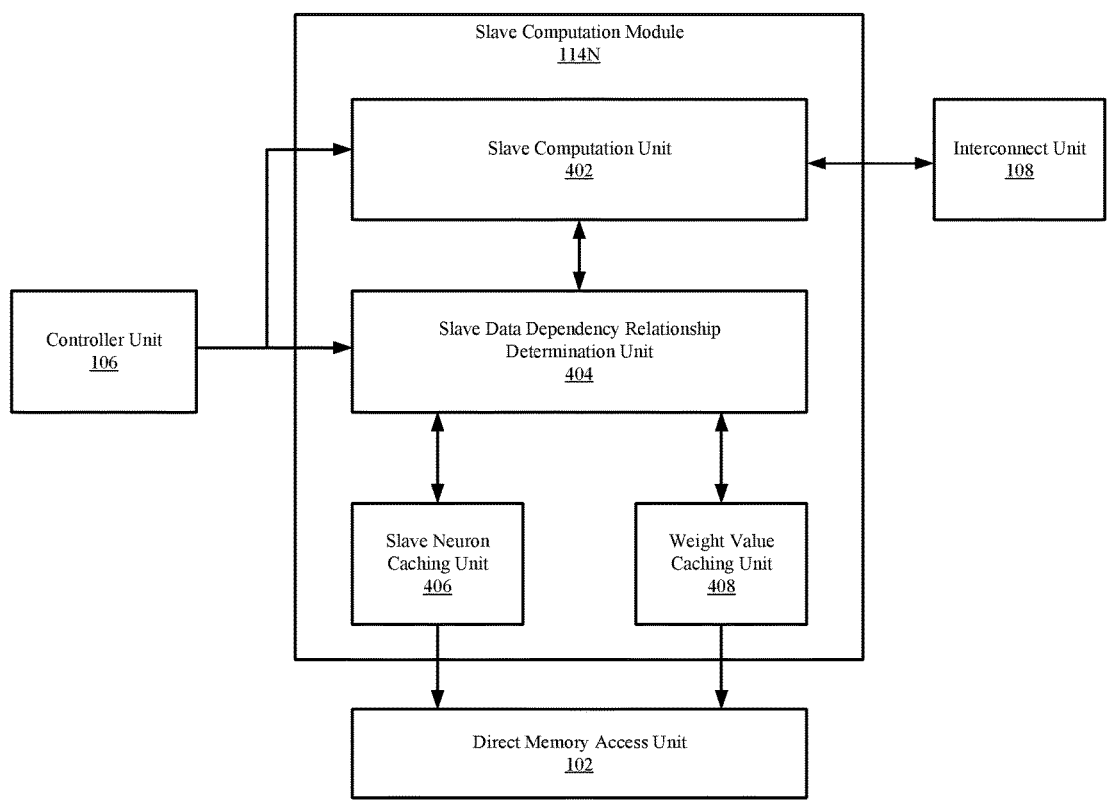
FIG. 4 is a block diagram of the structure of the slave computation modules in the apparatus for performing a forward propagation computation of artificial neural networks according to embodiments of the present disclosure.

FIG. 4 is a block diagram of the structure of the slave computation modules in the apparatus for performing a forward propagation computation of artificial neural networks according to embodiments of the present disclosure. As shown in FIG. 4, each slave computation module 114 may include a slave computation unit 402, a slave data dependency relationship determination unit 404, a slave neuron caching unit 406, and a weight value caching unit 408.

The slave computation unit 402 may be configured to receive micro-instructions transmitted from the controller unit 106 and to perform arithmetic and/or logical operations. The slave data dependency relationship determination unit 404 may be configured to perform reading/writing operations to the slave neuron caching unit 406. Before performing the reading/writing operations, the slave data dependency relationship determination unit 408 may be configured to determine that there is no conflict in the reading/writing consistency in the data used by the micro-instructions. For example, all micro-instructions transmitted to the slave data dependency relationship determination unit 404 may be stored in an instruction queue within the slave data dependency relationship determination unit 404. The instruction queue may indicate the relative priorities of the stored micro-instructions. In this instruction queue, if the range to be read indicated by the reading micro-instruction conflicts with the range to be written according to the writing micro-instruction of higher priority in the front of the instruction queue, then the reading micro-instruction cannot be executed unless the writing instruction that it depends on is executed.

The slave neuron caching unit 406 may be configured to cache the input vector and the slave output value generated by the slave computation unit 402.

The weight value caching unit 408 may be configured to cache the weight values for the slave computation unit 402 in the process. For each slave computation module 114, the weight value caching unit 408 may be configured to store a portion of the weight matrix, e.g., a submatrix of the weight matrix.

The slave computation modules 114 may be configured to process portions of the forward propagation computation that may be calculated parallelly. Taking a full connection layer of the neural network (e.g., the $i^{th}$ layer in FIG. 1) as an example, the forward propagation process may be represented by out=f(w×in+b), in which w represents the weight matrix, in represents the input vector, b represents a bias value, f ( ) represents an activation function, and out represents the output vector. The input vector and the output vector may both be column vectors. For example, the weight matrix may be in the form of $$\begin{pmatrix} W_{11} & W_{12} & W_{13} & \ldots & W_{1j} & \ldots & W_{1L_i} \\ W_{21} & W_{22} & W_{23} & \ldots & W_{2j} & \ldots & W_{2L_i} \\ W_{31} & W_{32} & W_{33} & \ldots & W_{3j} & \ldots & W_{3L_i} \\ \vdots & \vdots & \vdots & \vdots & \vdots & \vdots & \vdots \\ W_{j1} & W_{j2} & W_{j3} & \ldots & W_{jj} & \ldots & W_{jL_i} \\ \vdots & \vdots & \vdots & \vdots & \vdots & \vdots & \vdots \\ W_{L_{i+1}1} & W_{L_{i+1}2} & W_{L_{i+1}3} & \ldots & W_{L_{i+1}j} & \ldots & W_{L_{i+1}L_i} \end{pmatrix}$$

and the input vector may be represented as $$\begin{pmatrix} in_1 \\ in_2 \\ in_3 \\ \vdots \\ in_j \\ \vdots \\ in_N \\ \vdots \\ in_{L_i} \end{pmatrix}.$$

As described above, the input vector may be segmented. The segments of the input vector may be sequentially processed by the slave computation modules 114. In at least some examples, the length of each segment of the input vector may be determined based on the number of the slave computation modules 114. For example, the length of each segment may be determined to be N. For example, the first segment of the input vector may be represented as $$\begin{pmatrix} in_1 \\ in_2 \\ in_3 \\ \vdots \\ in_j \\ \vdots \\ in_N \end{pmatrix}.$$

The first segment may be transmitted to and stored in the slave computation modules 114. Further, the weight matrix may be divided into multiple submatrices respectively corresponding to different segments of the input vector. Each submatrix may be an N×N matrix include N column vectors and N row vectors. For example, the submatrix corresponding to the first segment of the input vector may be the top left submatrix in the weight matrix, i.e., $$\begin{pmatrix} W_{11} & W_{12} & W_{13} & \ldots & W_{1j} & \ldots & W_{1N} \\ W_{21} & W_{22} & W_{23} & \ldots & W_{2j} & \ldots & W_{2N} \\ W_{31} & W_{32} & W_{33} & \ldots & W_{3j} & \ldots & W_{3N} \\ \vdots & \vdots & \vdots & \vdots & \vdots & \vdots & \vdots \\ W_{j1} & W_{j2} & W_{j3} & \ldots & W_{jj} & \ldots & W_{jN} \\ \vdots & \vdots & \vdots & \vdots & \vdots & \vdots & \vdots \\ W_{N1} & W_{N2} & W_{N3} & \ldots & W_{Ni} & \ldots & W_{NN} \end{pmatrix}.$$

Taking the first segment of the input vector as an example, the slave computation modules 114 may be configured to calculate a result of the multiplication of the above submatrix of the weight matrix and the first segment of the input vector. The multiplication may be represented as $$\begin{pmatrix} W_{11} & W_{12} & W_{13} & \ldots & W_{1j} & \ldots & W_{1N} \\ W_{21} & W_{22} & W_{23} & \ldots & W_{2j} & \ldots & W_{2N} \\ W_{31} & W_{32} & W_{33} & \ldots & W_{3j} & \ldots & W_{3N} \\ \vdots & \vdots & \vdots & \vdots & \vdots & \vdots \\ W_{j1} & W_{j2} & W_{j3} & \ldots & W_{jj} & \ldots & W_{jN} \\ \vdots & \vdots & \vdots & \vdots & \vdots & \vdots \\ W_{N1} & W_{N2} & W_{N3} & \ldots & W_{Ni} & \ldots & W_{NN} \end{pmatrix} \begin{pmatrix} in_1 \\ in_2 \\ in_3 \\ \vdots \\ in_j \\ \vdots \\ in_N \end{pmatrix},$$

which may be further shown as $$\begin{pmatrix} W_{11} \cdot in_1 + W_{12} \cdot in_2 + \ldots + W_{1j} \cdot in_j + \ldots + W_{1N} \cdot in_N \\ W_{21} \cdot in_1 + W_{22} \cdot in_2 + \ldots + W_{2j} \cdot in_j + \ldots + W_{2N} \cdot in_N \\ W_{31} \cdot in_1 + W_{32} \cdot in_2 + \ldots + W_{3j} \cdot in_j + \ldots + W_{3N} \cdot in_N \\ \vdots \\ W_{j1} \cdot in_1 + W_{j2} \cdot in_2 + \ldots + W_{jj} \cdot in_j + \ldots + W_{jN} \cdot in_N \\ \vdots \\ W_{N1} \cdot in_1 + W_{N2} \cdot in_2 + \ldots + W_{Nj} \cdot in_j + \ldots + W_{NN} \cdot in_N \end{pmatrix}.$$

Each slave computation module 114 may be configured to calculate the multiplication between a row vector in the submatrix with the first segment of the input vector. For example, the $j^{th}$ slave computation module 114J may be configured to calculate the multiplication between the segment $$\begin{pmatrix} in_1 \\ in_2 \\ in_3 \\ \vdots \\ in_j \\ \vdots \\ in_N \end{pmatrix}$$

and the $j^{th}$ weight row vector ($W_{j1}$, $W_{j2}$, $W_{j3}$, ... $W_{jj}$, ... $W_{jN}$) to generate a slave output value: ($W_{j1} \cdot in_1 + W_{j2} \cdot in_2 + \ldots + W_{jj} \cdot in_j + \ldots + W_{jN} \cdot in_N$). The weight value caching unit 408 included in the $j^{th}$ slave computation module 114 may be configured to only store the weight values relevant to the multiplication, e.g., the $j^{th}$ weight row vector.

With respect to other segments of the input vector, e.g., $$\begin{pmatrix} in_{k+1} \\ in_{k+2} \\ in_{k+3} \\ \vdots \\ in_{k+j} \\ \vdots \\ in_{k+N} \end{pmatrix},$$

a slave computation module 114 may be configured to perform a similar multiplication between the segment and a corresponding submatrix of the weight matrix to generate a slave output value.

The slave output values generated respectively by the slave computation modules 114 may be output to and combined by the interconnection unit 108 into an intermediate result vector. In an example where the length of the output vector $L_{i+1}$ is greater than the number of the slave computation modules N, the intermediate result vectors calculated based on different submatrices of the weight matrix may be combined.

Intermediate result vectors generated based on multiple segments of the input vector may be further combined into a merged intermediate vector by the master computation module 112.

The master computation module 112 may be configured to perform one or more operations to the merged intermediate vector to generate the output vector. The operations may include adding a bias to the intermediate result vector, pooling (e.g., max-pooling (MAXPOOLING) or average pooling (AVGPOOLING)), activating with an activation function, sampling, etc. The activation function may be sigmoid function, tan h function, relu function, softmax function, etc.

Figure 5:
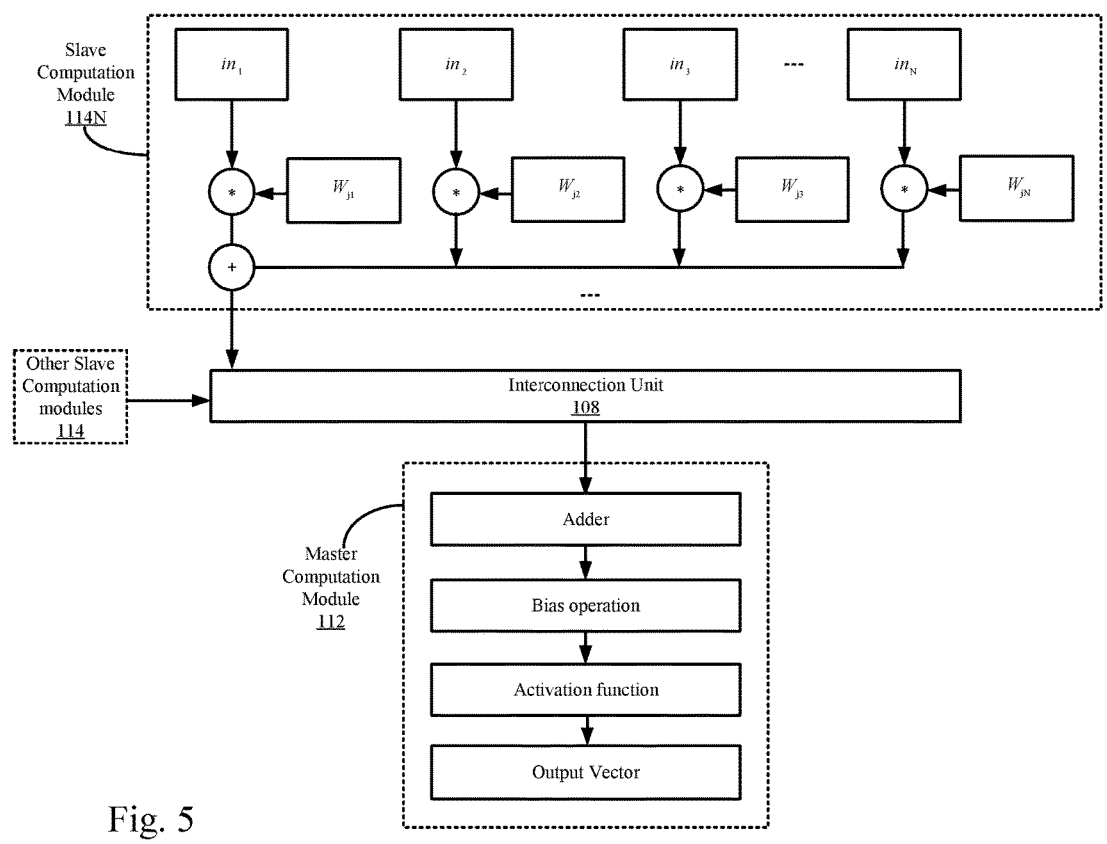
FIG. 5 is a block diagram of the forward propagation computation process of neural networks according to embodiments of the present disclosure.

FIG. 5 is a block diagram of the forward propagation computation process of neural networks according to embodiments of the present disclosure. As described above, a $j^{th}$ slave computation module 114J may be configured to multiply the input vector $(in_1, in_2, in_3, \ldots in_N)$ by the respective weight vector stored in the weight value caching unit 408, e.g., $(W_{j1}, W_{j2}, W_3, \ldots W_{jj}, \ldots W_{jN})$, to generate a slave output value. The slave output values may be transmitted to the interconnection unit 108 and combined into an intermediate result vector.

The intermediate result vector may be further transmitted to the master computation module 112. Multiple intermediate result vectors generated based on the segments of the input vector may be further combined by the master computation module 112 to generate a merged intermediate vector. For example, the master computation module 112 may be configured to perform a vector addition on the received intermediate result vectors to generate the merged intermediate vector. The master computation module 112 may be configured to perform a bias operation by adding a bias value to the merged intermediate vector and to apply an activation function to the biased merged intermediate vector to generate the output vector.

Figure 6:
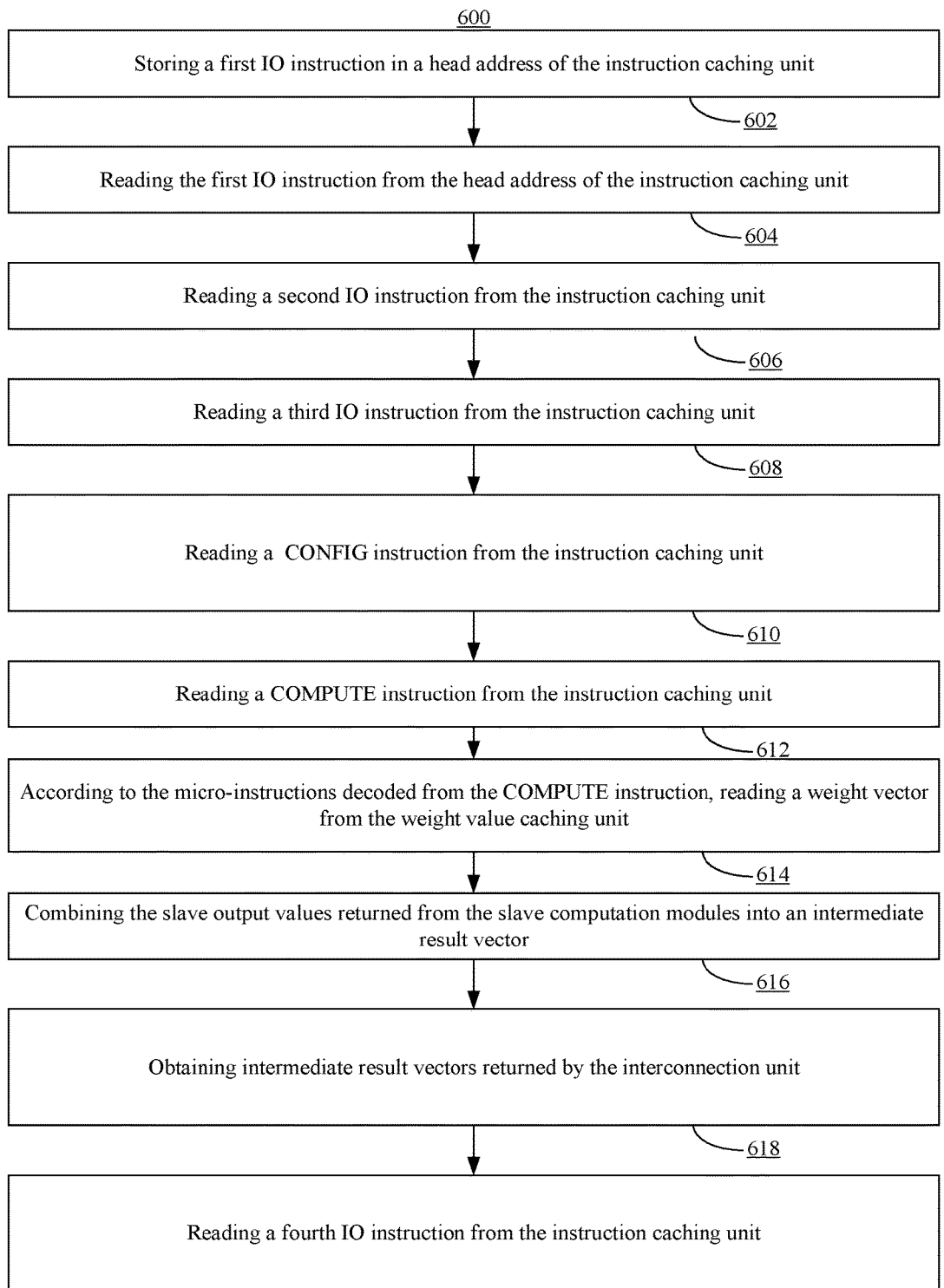
FIG. 6 is a flow diagram of the operation of single-layer artificial neural network according to embodiments of the present disclosure.

FIG. 6 is a flow diagram of a process 600 of single-layer artificial neural network according to embodiments of the present disclosure.

At block 602, a first TO instruction may be pre-stored in a head address of the instruction caching unit 104. The first TO instruction may include information with respect to the reading of the input vector from a first external address space and the writing of the output vector to a second external address space.

At block 604, the controller unit 106 may be configured to read the first TO instruction from the head address of the instruction caching unit 104. The controller unit 106 may be further configured to decode the first TO instruction into one or more micro-instructions. According to the decoded micro-instructions, the direct memory access unit 102 may be configured to read the corresponding instructions for the neural network from an external address space and transmit the instructions to the instruction caching unit 104.

At block 606, the controller unit 106 may be configured to read a second TO instruction from the instruction caching unit 104 and to decode the second TO instruction into micro-instructions. According to the decoded micro-instructions, the direct memory access unit 102 may be configured to read data for the master computation module 112 (e.g., data comprising input vectors, interpolation table, constant table, and bias values etc.) into the master neuron caching unit 306 of the master computation module 112 from an external address space, e.g., an external storage device.

At block 608, the controller unit 106 may be configured to read a third IO instruction from the instruction caching unit 104 and decode the third IO instruction into micro-instructions. According to the decoded micro-instructions, the direct memory access unit 102 may be configured to read data of a weight matrix for the slave computation modules 114 from an external address space.

At block 610, the controller unit 106 may configured to read a CONFIG instruction from the instruction caching unit 104 and decode the CONFIG instruction into micro-instructions. The CONFIG instruction may include various constants required in the operation of the current layer before the computation of artificial neural networks of each layer starts. According to the decoded micro-instructions, the master computation unit 302 and/or the slave computation unit 402 may be configured to preset values of the registers according to the parameters in the micro-instructions. The parameters, for example, may include data of calculation accuracy setting and activation function of this layer (for instance, the accuracy bit of calculation of current layer, the rang parameter of Lrn layer algorithm, the reciprocal of the window size of the AveragePooling layer algorithm).

At block 612, the controller unit 106 may be configured to read a COMPUTE instruction from the instruction caching unit 104 and decode the COMPUTE instruction into micro-instructions. The COMPUTE instruction may include information for performing the arithmetic logical calculation of artificial neural networks of each layer. According to the decoded micro-instructions, the master computation module 112 may be configured to transmit the input vector or a segment of the input vector to respective slave computation modules 114 via the interconnection unit 108. The input vector may be stored in the slave neuron caching unit 406 in each of the slave computation modules 114.

At block 614, according to the micro-instructions decoded from the COMPUTE instruction, the slave computation unit 402 of the slave computation module 114 may be configured to read a weight vector from the weight value caching unit 408 (e.g., a row vector in the weight matrix corresponding to the slave computation module 114). The slave computation unit 402 may be configured to further read the input vector from the slave neuron caching unit 406 and completes the multiplication (e.g., a dot product operation) between the weight vector and the input vector to generate a slave output value. Slave output values from different slave computation modules 114 may be transmitted to the interconnection unit 108.

At block 616, the slave output values returned from the slave computation modules 114 may be combined into an intermediate result vector.

At block 618, the master computation module 112 may be configured to obtain intermediate result vectors returned by the interconnection unit 108. According to the micro-instructions decoded from the COMPUTE instruction, the master computation module 112 may be configured to combine the intermediate result vectors into a merged intermediate vector by performing, e.g., a vector addition operation. The master computation module 112 may be further configured to perform a bias operation. For example, a bias vector may be read from the master neuron caching unit 306 and added to the merged intermediate vector. The biased vector may be further activated in accordance with an activation function to generate an output vector. The output vector may be written back to the master neuron caching unit 306.

At block 620, the controller unit 106 may be configured to read a fourth IO instruction from the instruction caching unit 104 and decode the fourth IO instruction into micro-instructions. According to the micro-instructions, the direct memory access unit 102 may be configured to store the output vector in the master neuron caching unit 306 to a specified address of an external address space.

For a multi-layer artificial neural network, its implementation is similar to the implementation of a single-layer neural network. When the execution of the artificial neural network of the previous layer completes, the operation instruction of the next layer uses the output neuron address of the previous layer stored in the master operation unit as the input neuron address of this layer. Similarly, the weight address and bias address in the instruction will turn into the addresses corresponding to the current layer.

The utilization of the apparatus and instruction set for performing the forward computation of artificial neural networks eliminates the defects caused by lower performance of CPU and GPU operation as well as high overhead of front-end transcoding, which effectively improves the support to forward computations of multi-layer artificial neural networks.

In addition, the utilization of a specific on-chip cache for the forward computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the forward computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation.

We claim:

1. An apparatus for forward propagation of a multilayer neural network, comprising:
   a plurality of computation modules connected via an interconnection unit; and
   a controller unit configured to decode an instruction into one or more groups of micro-instructions,
      wherein the plurality of computation modules are configured to perform respective groups of the micro-instructions, and
      wherein the plurality of computation modules include:
         multiple slave computation modules configured to parallelly calculate multiple groups of slave output values based on an input vector received via the interconnection unit, and
         a master computation module configured
            to calculate a merged intermediate vector based on one or more intermediate result vectors combined by the interconnection unit based on the multiple groups of slave output values calculated by the multiple slave computation modules, and
            to generate an output vector based on the merged intermediate vector.

2. The apparatus of claim 1, wherein the master computation module is configured to perform one operation selected from the group consisting of:
   adding a bias value to the merged intermediate vector;
   activating the merged intermediate vector with an activation function;
   outputting a predetermined value based on a comparison between the merged intermediate vector and a random number; and
   pooling the merged intermediate vector.

3. The apparatus of claim 2, wherein the master computation module includes:
   a master neuron caching unit configured to cache data;
   a master computation unit configured to perform the selected operation;
   a master data dependency relationship determination unit configured to prevent the instruction from being executed based on a determination that a conflict exists between the instruction and other instructions.

4. The apparatus of claim 1, wherein each of the slave computation modules includes a slave neuron caching unit configured to store the input vector.

5. The apparatus of claim 1, wherein the interconnection unit is structured as a binary tree including one or more levels, each of which includes one or more nodes,
   wherein each of the nodes at one level is connected to two nodes at a lower level, and
   wherein each of the nodes transmits same data to the two nodes at the lower level and combines data received from the two nodes at the lower level.

6. The apparatus of claim 1, wherein each of the slave computation modules includes:
   a slave computation unit configured to receive the one or more groups of micro-instructions and to perform arithmetic logical operations;
   a slave data dependency relationship determination unit configured to perform reading/writing operations to a slave neuron caching unit, a weight value caching unit, and a weight gradient caching unit based on a determination that no conflict exists between the reading/writing operations; and
   a weight value caching unit configured to store weight vectors.

7. The apparatus of claim 6, wherein the slave data dependency relationship determination unit configured to
   determine whether there is dependent relationship between a first micro-instruction which has not been executed and a second micro-instruction which is being executed;
   if there is no dependent relationship, allow the micro-instruction which has not been executed to be executed immediately, otherwise, the micro-instruction which has not been executed will not be allowed to execute until the execution of all the micro-instructions upon which that micro-instruction which has not been executed depend is completed.

8. The apparatus of claim 1, wherein the instruction is selected from the group consisting of a CONFIG instruction for configuring constants required by computation of the current layer prior to starting computation of the artificial neural network of each layer,
a COMPUTE instruction for completing arithmetical logic computation of the multilayer neural network of each layer, and
an IO instruction for reading in the input data required by computation from an external address space and storing the data back into the external space after completion of computation.

9. The apparatus of claim 1, further comprising:
an instruction caching unit configured to store the instruction; and
a direct memory access unit configured to transmit data to the computation modules from an external storage device and receive data from the computation modules to the external storage device.

10. A method for forward propagation of a multilayer neural network, comprising:
receiving, by a controller unit, an instruction;
decoding, by the controller unit, the instruction into one or more groups of micro-instructions;
assigning, by the controller unit, the one or more groups of micro-instruction respectively to a plurality of computation modules;
parallelly calculating, by multiple slave computation modules, multiple groups of slave output values based on an input data vector received via an interconnection unit;
combining, by the interconnection unit, the multiple groups of slave output values to generate an intermediate result vector;
calculating, by a master computation module, a merged intermediate vector based on at least the intermediate result vector; and
generating, by the master computation module, an output vector based on the merged intermediate vector.

11. The method of claim 10, further comprising performing an operation selected from the group consisting of:
adding a bias value to the merged intermediate vector;
activating the merged intermediate vector with an activation function;
outputting a predetermined value based on a comparison between the merged intermediate vector and a random number; and
pooling the merged intermediate vector.

12. The method of claim 11, further comprising:
caching data by a master neuron caching unit included in the mast computation module; and
preventing, by a master data dependency relationship determination unit, the instruction from being executed based on a determination that a conflict exists between the instruction and other instructions.

13. The method of claim 10, further comprising storing, by a slave neuron caching unit included in each of the slave computation modules, the input vector.

14. The method of claim 10, wherein the interconnection unit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

15. The method of 11, further comprising:
receiving, by a slave computation unit included in the slave computation module, the one or more groups of micro-instructions;
performing arithmetic logical operations according to the micro-instructions;
perform, by a slave data dependency relationship determination unit, reading/writing operations to a slave neuron caching unit, a weight value caching unit, and a weight gradient caching unit based on a determination that no conflict exists between the reading/writing operations; and
storing, by a weight value caching unit include in the slave computation module, weight vectors.

16. The method of claim 15, further comprising:
determining, by the slave data dependency relationship determination unit, whether there is dependent relationship between a first micro-instruction which has not been executed and a second micro-instruction which is being executed;
allowing, by the slave data dependency relationship determination unit, the micro-instruction which has not been executed to be executed immediately if there is no dependent relationship;
preventing, by the slave data dependency relationship determination unit, the micro-instruction which has not been executed from being executed if dependent relationship exists.

17. The method of claim 10, wherein the instruction is selected from the group consisting of
a CONFIG instruction for configuring constants required by computation of the current layer prior to starting computation of the artificial neural network of each layer,
a COMPUTE instruction for completing arithmetical logic computation of the multilayer neural network of each layer, and
an IO instruction for reading in the input data required by computation from an external address space and storing the data back into the external space after completion of computation.

18. The method of claim 10, further comprising:
storing, by an instruction caching unit, the instruction;
transmitting data, by a direct memory access unit, to the computation modules from an external storage device; and
receiving data, by a direct memory access unit, from the computation modules to the external storage device.

* * * * *